United States Patent Office 2,813,898
Patented Nov. 19, 1957

2,813,898
SULFONIUM SULFONATES

Van R. Gaertner, Dayton, Ohio, assignor to Monsanto Chemical Company, St. Louis, Mo., a corporation of Delaware No Drawing. Application September 13, 1955, Serial No. 534,176

11 Claims. (Cl. 260—505)

The present invention relates to organic sulfur compounds and more particularly provides certain hitherto unknown sulfonium compounds, methods of producing the same, and herbicidal compositions in which said sulfonium compounds are employed as the active ingredients.

According to the invention there are provided new and valuable sulfoniumalkanesulfonates of the formula

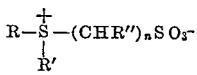

in which R and R' are hydrocarbon radicals free of nonbenzenoid unsaturation and containing from 1 to 18 carbon atoms, R" is selected from the class consisting of hydrogen and the methyl radical and $n$ is an integer of from 1 to 4. Compounds having the above general formula are zwitterion type salts which I have found to be readily obtainable by (I) the condensation reaction of an appropriate mercaptoalkanesulfonate and a hydrocarbon sulfate or (II) by the addition reaction of a hydrocarban thioether and an alkanesultone substantially according to the schemes:

(I)

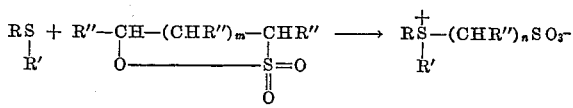

in which R, R' and R" and $n$ are as herein defined, M is alkali metal, i. e., sodium, potassium or lithium and $m$ is an integer of from 1 to 2.

(II)

in which R, R", M and $n$ are as defined above and Y is selected from the class consisting of alkyl and aralkyl radicals of from 1 to 18 carbon atoms.

One class of sulfoniumalkanesulfonates provided by the present invention comprises dialkylsulfoniumalkanesulfonates having from 1 to 18 carbon atoms in the alkyl radical, e. g., 2-(dimethylsulfonium)-1-ethanesulfonate, 3-(n - propylisoamylsulfonium) - 1 - propanesulfonate, 2-(ethyloctadecylsulfonium) - 1 - ethanesulfonate, 4-(di-n-dodecylsulfonium)-1-butanesulfonate, 3-(methyl-n-octyl-sulfonium)-2-propanesulfonate, 3-(n-heptylmethylsulfonium)-1-butanesulfonate, di - tert-butylsulfonium-methanesulfonate, 3-(n-decyl - n - amylsulfonium)-2-butanesulfonate, etc. These are prepared by reacting the appropriate alkylmercaptoalkanesulfonate with an appropriate dialkyl sulfate, or by reacting an appropriate dialkyl sulfide with an appropriate alkanesultone. The alkylmercaptoalkanesulfonates may be prepared by the reaction of an alkanethiol with an alkanesultone according to the process described in my copending application Serial No. 474,283, filed December 9, 1954, or by the reaction of an alkanethiol with an alkali metal isethionate as disclosed in my copending application Serial No. 474,282, filed December 9, 1954, now abandoned. Thus, for the preparation of, e. g., 3-(tert-dodecylethylsulfonium)-1-propanesulfonate, there may first be prepared sodium 3-(tert-dodecylmercapto)-1-propanesulfonate by the addition reaction of tert-dodecanethiol with propanesultone, i. e., the sultone of 3-hydroxypropanesulfonic acid in the presence of sodium hydroxide according to the process of the former of said copending applications; and the sodium 3-(tert - dodecylmercapto) - 1 - propanesulfonate thus obtained is reacted with diethyl sulfate according to the present invention to give the 3-(tert-dodecylethyl-sulfonium)-1-propanesulfonate, together with sodium ethyl sulfate as by-product. The dialkylsulfoniumalkanesulfonates may also be prepared by reacting an alkyl sulfide with an alkanesultone; e. g., for the preparation of 4-(di-n-butylsulfonium)-1-butanesulfonate, butyl sulfide is reacted with the sultone of 4-hydroxy-1-butanesulfonic acid.

Another class of the presently provided sulfonium sulfonates includes the diarylsulfoniumalkanesulfonates, e. g., 2-(diphenylsulfonium)-1-butanesulfonate which is obtainable from diphenyl sulfide and the sultone of 4-hydroxy-1-butanesulfonic acid; 3-(di-α-naphthylsulfonium)-1-propanesulfonate obtainable from naphthyl sulfide and the sultone of 3-hydroxypropanesulfonic acid, etc.

Still another class of sulfonium sulfonates which are provided by the invention are the bis(alkaryl)sulfoniumalkanesulfonates, e. g., the 2-[bis(2-ethylphenyl)sulfonium]-1-propanesulfonate obtained from 2-ethylphenyl sulfide and the sultone of 3-hydroxy-1-propanesulfonic acid, or the 4-(di-4-tolylsulfonium)-1-butanesulfonate prepared from 4-tolyl sulfide and the sultone of 4-hydroxybutanesulfonic acid.

A further class of presently provided sulfonium sulfonates includes the bis(aralkyl) or the bis(alkarylalkyl)-sulfoniumalkanesulfonates, e. g., the 2-(dibenzylsulfonium)-1-ethanesulfonate prepared from an alkali metal 2-(benzylmercapto)-1-ethanesulfonate and benzyl sulfate; the 3-[bis(3-phenyl - n - propyl)sulfonium]-1-propanesulfonate prepared from bis(3-phenyl-n-propyl)sulfide and the sultone of 3-hydroxypropanesulfonic acid; or the 2-[bis(4 - ethylbenzyl)sulfonium] - 1 - ethanesulfonate prepared from sodium 2-[(4-ethylbenzyl)mercapto]-1-ethanesulfonate and bis(4-ethylbenzyl) sulfate.

Still another class of sulfonium sulfonates provided by the invention are the di(cycloalkyl)sulfoniumalkanesulfonates, e. g., 2-(dicyclohexylsulfonium)-1-ethanesulfonate or 3-[bis(4-methylcyclopentyl)sulfonium]-1-propanesulfonate.

The hydrocarbon radicals which are attached to the sulfonium radical may be the same, as in the compounds mentioned above, or they may be dissimilar. When such hydrocarbon radicals are to be the same, there is employed in the sulfide-sultone reaction a simple sulfide, e. g., n-butyl sulfide, benzyl sulfide, etc. In the alkali metal hydrocarbonmercaptoalkanesulfonate-hydrocarbon sulfate reaction, when the hydrocarbon radicals of the sulfonate and the sulfate are the same, the sulfonium sulfate obtained therefrom will have like hydrocarbon radicals attached to the sulfonium group, i. e., sodium 2-isopropylmercapto-1-ethanesulfonate reacted with diisopropyl sulfate gives 2 - (diisopropylsulfonium) - 1-ethanesulfonate, with sodium isopropyl sulfate as the by-product. When it is desired to prepare compounds having two dissimilar hydrocarbon radicals attached to the sulfonium group, the preparation from sulfide and sultone requires the use of a mixed sulfide, e. g., from ethyl phenyl sulfide and the sultone of 3-hydroxypropanesulfonic acid there is obtained 3-(ethylphenylsulfonium)-

1-propanesulfonate; from benzyl methyl sulfide and the sultone of 4-hydroxy-2-pentane sulfonic acid there is obtained 4-(benzylmethylsulfonium)-2-pentanesulfonate. When employing the mercaptoalkanesulfonate-hydrocarbon sulfate process, the preparation of sulfonium sulfonates having two dissimilar hydrocarbon radicals attached to the sulfonium group requires the use of a hydrocarbonmercaptoalkanesulfonate with a sulfate having hydrocarbon groups that are different from that which is attached to the mercapto sulfur of the sulfonate, e. g., from sodium 2-(octadecylmercapto)-1-ethanesulfonate and dimethyl sulfate there is obtained 2-(methyloctadecylsulfonium)-1-ethanesulfonate and from potassium 3-(2-amylbenzylmercapto)-1-propanesulfonate and dibenzyl sulfate there is obtained 3-[(2-amylbenzyl)benzylsulfonium]-1-propanesulfonate.

Preparation of the present sulfonium sulfonates by either process is readily effected by contacting the two reactants at ordinary or increased temperatures and allowing the resulting mixture to stand until formation of the present zwitterion type salts has occurred. However, in order to expedite the reaction, heating at, say, temperatures of from 80° C. to 150° C., depending upon the nature of the individual reactants, is generally beneficial. When the sulfonium sulfonates are prepared from the hydrocarbonmercaptoalkanesulfonate and the sulfate, the reaction takes place with formation of an alkali metal hydrocarbon sulfate as by-product. This can be readily separated from the desired sulfonium sulfonate by taking advantage of solubility differences of the products. The sulfonium sulfonates are generally insoluble in such organic solvents as acetone and the aromatic hydrocarbons but soluble in the lower alcohols and water; whereas the by-product sulfates do not possess these solubility characteristics to so marked a degree. The sulfonium sulfonates may also be separated from the by-product sulfates as well as from any unreacted initial reactants by other isolating procedures customarily employed in the arts, e. g., by distillation, fractional crystallization, etc.

In the sulfide-sultone reaction, which takes place by addition of one component to another, isolation of the sulfonium sulfonate is effected by removing unreacted material, if any, by distillation, by removing the sulfonate with water, etc. In most instances, however, when employing substantially equimolar quantities of sulfide and sultone, no isolating procedures are required, the crude reaction mixture being applicable for direct agricultural or industrial application.

While reaction of the hydrocarbonmercaptoalkanesulfonate with the hydrocarbon sulfate or reaction of the hydrocarbon sulfide with the alkanesultone may be effected either in the presence or absence of an inert solvent or diluent, operation may be smoother and manipulation of the reactants facilitated when a solvent or diluent is used. When working with the sulfonate, water or a mixture of water and an inert solvent or diluent is preferably employed. Organic materials which may be used as diluents include xylene, benzene, toluene, hexane, etc.

The present sulfonium sulfonates are stable, usually water-soluble white to somewhat colored friable solids or viscous liquids. They are advantageously employed for a variety of industrial and agricultural purposes. They are generally valuable biological toxicants, e. g., as molluscacides, nematocides, bacteriostats, fungistats, etc. The aliphatic sulfonium sulfonates are generally useful as herbicides, some of these compounds having selective activity. The aromatic sulfonium sulfonates, and particularly those having a long-chain alkyl group as a nuclear substituent possess valuable surface-active properties. The aralkyl sulfonium sulfonates are valuable as textile adjuvants, e. g., as softening and antistatic agents.

The present invention is further illustrated, but not limited, by the following examples:

*Example 1*

A mixture consisting of 10.4 g. (0.030 mole) of sodium 2-(n-octylmercapto)-1-ethanesulfonate (purity, 80%) and 12.6 g. (0.1 mole) of dimethyl sulfate was heated at 125–130° C. for 1 hour. The reaction mixture was washed with acetone in a Waring blendor, and the whole was filtered to obtain 9.9 g. of a brown, translucent, very hygroscopic solid. To 6.2 g. of this there was added 50 ml. of water. Crystallization began upon introduction of the water and concentration to 15 ml. with subsequent cooling gave a good crop of white crystals. These were recrystallized from water three times and the hydrate, M. P. 55–65° C., thus obtained was dried above 100° C. to give the substantially pure 2-(methyl-n-octylsulfonium)-1-ethanesulfonate, M. P. 158–163° C., analyzing (after vacuum drying at 56° C.) as follows:

|  | Found | Calcd. for $C_{11}H_{22}O_3S_2$ |
|---|---|---|
| Percent C | 49.85 | 49.2 |
| Percent H | 9.31 | 9.02 |

*Example 2*

A mixture consisting of 13.3 g. (0.030 mole) of sodium 2-(tert-hexadecylmercapto)-1-ethanesulfonate and 12.6 g. (0.1 mole) of dimethyl sulfate was heated rapidly on an oil bath to 130° C. The solid dissolved within a few minutes, and the reaction mixture was then maintained at 125° to 130° C. for one hour. It was then allowed to stand at room temperature for several weeks. The crystalline cake which thus formed was separated, broken up and washed with acetone in a Waring blendor to obtain 10.2 g. of the solid 2-(tert-hexadecylmethylsulfonium)-1-ethanesulfonate.

*Example 3*

This example describes the preparation of 3-(dibenzylsulfonium)-1-propanesulfonate by the addition reaction of dibenzyl sulfide and propanesultone, i. e., the sultone of 3-hydroxy-1-propanesulfonic acid. A mixture consisting of 21.4 g. (0.10 mole) of the sulfide and 12.2 g. (0.10 mole) of the sultone in 20 ml. of xylene was heated to a temperature of about 120° C. for 2 hours. An almost colorless, homogeneous solution was first formed, and then a heavy oil began to separate out. Heating was continued for a total of 18 hours, at the end of which time a viscous, light tan layer had formed. Upon cooling, this set to a glassy solid. After decanting the xylene layer, the residual glassy product was washed with toluene and then dissolved in methanol. The resulting solution was poured into acetone, and the whole allowed to stand until stratification had occurred. The viscous oil which formed one of the layers was decanted and washed with acetone to give the substantially pure 2-(dibenzylsulfonium)-1-propanesulfonate, soluble in water and methanol, but insoluble in ethanol and acetone.

*Example 4*

Herbicidal evaluation of the 2-(methyl-n-octylsulfonium)-1-ethanesulfonate of Example 1 was conducted as follows:

A flat planted with two-week old plants was sprayed to run-off with an 0.5 percent aqueous solution of said sulfonate. About twenty plants of each of the following varieties were growing in the flat: wild oat, brome grass, rye grass, buckwheat, radish, red clover, sugar beet, cucumber, cotton, corn and portulaca. The sprayed flat and a similar unsprayed flat (as control) were kept in a greenhouse for ten days under ordinary conditions of sunlight and watering. At the end of that time observation of the sprayed flat showed that the broadleaf plants were all dead; the grasses were only moderately injured. All of the plants in the unsprayed or "control" flat were in excellent condition.

What I claim is:

1. Sulfonium sulfonates of the formula

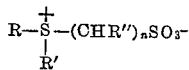

in which R and R' are hydrocarbon radicals free of non-benzenoid unsaturation and containing from 1 to 18 carbon atoms, R'' is selected from the class consisting of hydrogen and the methyl radical and $n$ is an integer of from 1 to 4.

2. Dialkylsulfoniumalkanesulfonates in which each alkyl radical has from 1 to 18 carbon atoms and the alkane group has from 1 to 4 carbon atoms.

3. 2-(methyl-n-octylsulfonium)-1-ethanesulfonate.

4. 2-(tert-hexadecylmethylsulfonium)-1-ethanesulfonate.

5. 3-(dibenzylsulfonium)-1-propanesulfonate.

6. The method which comprises contacting a mercapto alkanesulfonate of the formula $$RS(CHR'')_n SO_3 M$$

in which R is a hydrocarbon radical free of non-benzenoid unsaturation and containing from 1 to 18 carbon atoms, R'' is selected from the class consisting of hydrogen and the methyl radical, $n$ is an integer of from 1 to 4 and M is alkali metal with a sulfate of the formula $Y_2SO_4$ in which Y is selected from the class consisting of alkyl and aralkyl radicals of from 1 to 18 carbon atoms and recovering from the resulting reaction product a sulfonium-sulfonate of the formula

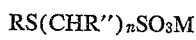

in which R, Y, R'' and $n$ are as herein defined.

7. The method which comprises contacting an alkali metal dialkylmercaptoalkanesulfonate having from 1 to 18 carbon atoms in the alkyl radical and from 1 to 4 carbon atoms in the alkane group with a dialkyl sulfate having from 1 to 18 carbon atoms in the alkyl radical and recovering from the resulting reaction product a dialkylsulfoniumalkanesulfonate having from 1 to 18 carbon atoms in the alkyl radical and from 1 to 4 carbon atoms in the alkane group.

8. The method which comprises heating at a temperature of from 80° C. to 150° C. sodium 2-(n-octylmercapto)-1-ethanesulfonate with dimethyl sulfate and recovering 2-(methyl-n-octylsulfonium)-1-ethanesulfonate from the resulting reaction product.

9. The method which comprises heating, at a temperature of from 80° C. to 150° C. sodium 2-(tert-hexadecylmercapto)-1-ethanesulfonate with dimethyl sulfate and recovering 2-(tert-hexadecylmethylsulfonium-1-ethanesulfonate from the resulting reaction product.

10. The method which comprises contacting a sulfide of the formula RSR' in which R and R' are hydrocarbon radicals, free of non-benzenoid unsaturation and containing from 1 to 18 carbon atoms with an alkanesultone of the formula

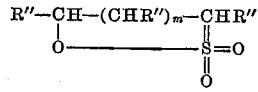

in which $m$ is an integer of from 1 to 2 and R'' is selected from the class consisting of hydrogen and the methyl radical, and recovering from the resulting reaction product a sulfonium sulfonate of the formula

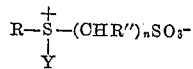

in which R, R' and R'' are as herein defined and $n$ is an integer of 1 to 4.

11. The method which comprises heating dibenzylsulfide with the sultone of 3-hydroxypropanesulfonic acid at a temperature of from 80° C. to 150° C. and recovering 3-(dibenzylsulfonium)-1-propanesulfonate from the resulting reaction product.

References Cited in the file of this patent

UNITED STATES PATENTS 2,185,654    Van Peski et al. _____ Jan. 2, 1940